(12) United States Patent
Ueno et al.

(10) Patent No.: US 6,377,766 B1
(45) Date of Patent: Apr. 23, 2002

(54) ELECTROPHOTOGRAPHIC APPARATUS HAVING A PRINTING DENSITY CONTROLLER FOR DROPOUT AND NON-DROPOUT COLOR

(75) Inventors: Hiroshi Ueno; Koutarou Yamada; Katuhiro Shinohara; Kouhei Katayama; Hisashi Nakajima, all of Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/694,338

(22) Filed: Oct. 24, 2000

(30) Foreign Application Priority Data

Oct. 29, 1999 (JP) ............................................. 11-307951

(51) Int. Cl.$^7$ ............................................. G03G 15/01
(52) U.S. Cl. ........................... 399/138; 399/50; 399/55; 399/223
(58) Field of Search ............................... 399/55, 50, 51, 399/138, 223; 358/1.9, 1.18

(56) References Cited

U.S. PATENT DOCUMENTS 5,111,235 A * 5/1992 Ueno et al. .................. 399/138
5,355,200 A * 10/1994 Ohba et al. .................. 399/138

FOREIGN PATENT DOCUMENTS

JP 11-78208 3/1999 ............ B41M/3/14

* cited by examiner

*Primary Examiner*—Joan Pendegrass
(74) *Attorney, Agent, or Firm*—Sughrue Mion, PLLC

(57) ABSTRACT

By providing a printing density controller for changing a printing density in a range from a dropout color to non-dropout color, an electrophotographic printing apparatus can conduct the light and shade adjustment of the printing density in a broad range, and also cope with the dropout color printing.

4 Claims, 4 Drawing Sheets

ELECTROPHOTOGRAPHIC APPARATUS HAVING A PRINTING DENSITY CONTROLLER FOR DROPOUT AND NON-DROPOUT COLOR

BACKGROUND OF THE INVENTION

1. Field of the Invention

The present invention relates to an electrophotographic [type] printing apparatus, and specifically to an electrophotographic printing apparatus by which dropout color printing can be determined.

2. Description of the Related Art

As a recording form in a printing apparatus, a method using a so-called electrophotographic process comes into general use, in which a photoreceptor surface is charged to a predetermined voltage, image exposure is conducted on the charged photoreceptor and an electrostatic latent image is formed, powder toner is supplied to the electrostatic latent image and a toner image is obtained on the photoreceptor surface, and this toner image is transferred onto the recording medium such as a sheet, an OHP sheet, or an intermediate transfer body.

As the developing system of this kind of electrophotographic printing apparatus, a normal developing system and a reversal developing system are known. For example, in the case of the reversal developing system, as shown in FIG. 5A, a developing bias voltage $V_B$ is set between a charging potential $V_0$ and an electrostatic latent image section potential (remaining potential) $V_R$ formed by the image exposure, and toner is adhered onto a contrast potential $|V_B-V_R|$ between the developing bias potential $V_B$ and the remaining potential $V_R$, and thereby a toner image having a predetermined density, for example, as shown in FIG. 5B, is obtained.

Further, when the toner image shown in FIG. 5B, is desired to express apparently as a light image, the following operations are conducted: a drive period of light to form the electrostatic latent image is finely controlled; the electrostatic latent image as shown in FIG. 6A is obtained; and the dotted toner image, for example, as shown in FIG. 6B is obtained by adhering the toner onto the latent image; thereby, the amount of the adhering toner per unit area is decreased so as to obtain the low density toner image; or as shown in FIG. 7, the developing bias potential $V_B$ is lowered so as to control the contrast potential $|V_B-V_R|$ to be decreased; and the toner image whose density is lower than that of the toner image of FIG. 5B, is obtained by adhering the toner onto the latent image.

Incidentally, the toner image obtained by the method of FIGS. 5A and 6B is seen apparently to be light in the density, however, since the contrast potential $|V_B-V_R|$ itself is the same value as in the case of FIGS. 5A and 5B, the density of each point d forming the dot is printed by the dark density same as the toner image in FIG. 5B. Further, although the density of the toner image obtained by the method of FIG. 7 is expressed to be lighter than the toner image in FIG. 5B, conventionally, in this type of printing apparatus, the range of the light and shade of the printing density is generally set to a range of the printing density of 1.0 D–1.4 D.

Recently, also in the printing apparatus using the electrophotographic process, the printing apparatus having the color printing function comes into general use, and the electrophotographic type printing apparatus is developing to conduct the dropout color printing (refer to JP-A-11-78208). Herein, the dropout color means a color, as described in JP-A-11-78208, used for a printed portion by a light color which is often seen in a portion such as an entry frame, note and so on for a payment sheet of the bank, test answer-sheet (mark sheet) and the like. Although an area printed by such a dropout color can be distinguished by the naked eye, it can not be distinguished by an optical reading apparatus having a predetermined wavelength.

In order to realize the dropout color printing, it is necessary that the printing can be conducted in the printing density lower than 0.7 D. Therefore, since the conventional printing apparatus conducts a light and shade adjustment of the printing density between 1.0 D–1.4 D, the dropout color printing can not be conducted.

SUMMARY OF THE INVENTION

The object of the present invention is to provide an electrophotographic printing apparatus in which the light and shade adjustment of the printing density can be conducted in the broad range, and which can also cope with the dropout color printing.

The above object can be attained by an electrophotographic printing apparatus that includes a charging means for charging a photoreceptor to a predetermined charging potential $|V_0|$ and an exposure means for exposing the charged photoreceptor and recording an electrostatic latent image having an electrostatic latent image section potential $|V_R|$ which is lower than the charging potential, on the photoreceptor.

A developing means is provided, having a developing roller on which a developing bias potential $|V_B|$ is applied, which is set between the charging potential and the electrostatic latent image section potential, and which adheres a powder color toner held on the developing roller to a portion of the charging potential when a developing method is a normal developing method and to a portion of the electrostatic latent image section potential when the developing method is a reversal developing method, and forms a toner image on the photoreceptor. A printing density control means changes a printing density within a range from a dropout color to a non-dropout color.

DETAILED DESCRIPTION OF THE PREFERRED EMBODIMENTS

Figure 1:
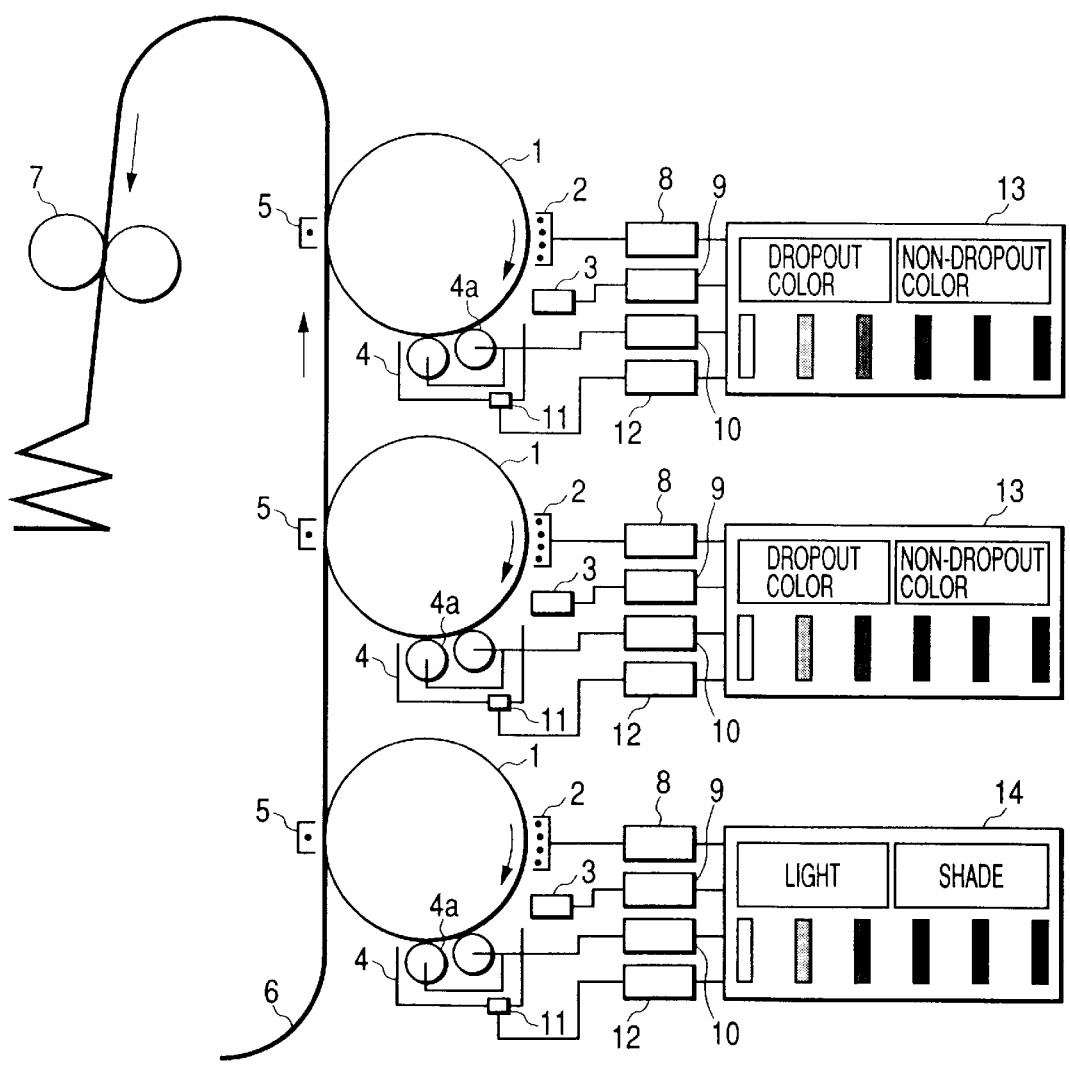
FIG. 1 is a schematic structural view of an electrophotographic type printing apparatus according to the invention.

Now, embodiments according to the invention will be described referring to the drawings.

Initially, referring to FIG. 1, a description will be given of an outline structure of a printer using an electrophotographic system according to the invention. In FIG. 1, numeral 1 is a photoreceptor drum. According to a printing operation start signal from a controller, not shown, the photoreceptor drum 1 starts to rotate in an arrowed direction. The photoreceptor drum 1 is rotated at a speed corresponding to a printing speed of a printer, and continues to rotate until a printing operation is completed. When the photoreceptor drum 1 starts to rotate, high voltage is applied onto a corona charger 2, and for example, positive electric charges are uniformly charged on a surface of the photoreceptor drum 1.

Next, a charged photoreceptor drum area is image-exposed by a light from an exposing apparatus 3 which has a light source such as a semiconductor laser, a light emitting diode and so on, and portions on which the light is irradiated and not irradiated are formed on the surface of the photo-receptor drum 1, and so-called an electrostatic latent image is formed. When the photoreceptor drum area holding thereon the electrostatic latent image reaches a position opposing to a developing apparatus 4, a powder toner held on a developing roller 4a is supplied to the electrostatic latent image, and the toner for example charged by the positive electric charges, is attracted on a portion where the electric charges on the photoreceptor drum 1 are eliminated by an irradiation of the light by the static electricity, and a toner image is formed on the photoreceptor drum 1. Incidentally, in case where a normal developing system is adopted as a developing system, of course, the toner adheres onto a portion where the light is not irradiated, and the photoreceptor drum 1 is developed.

A recording medium 6 accommodated in a sheet feed apparatus, not shown, (in this embodiment, a case where a continuous sheet continued in a longitudinal direction is used, is shown), is conveyed toward a position between the photoreceptor drum 1 and a transfer device 5 by a sheet conveying apparatus, not shown, so as to synchronize with a timing when the toner image formed on the photoreceptor drum 1 reaches a position of the transfer device 5. Incidentally, as the sheet conveying apparatus, a well known conveying means such as a conveying tractor or a conveying roller, is used.

The toner image formed on the photoreceptor drum 1 is attracted onto the recording medium 6 by an action of the transfer device 5 which gives the electric charge with a reverse polarity to the toner image, onto the rear surface side of the recording medium 6.

According to the above-described, the recording medium 6 is conveyed to a fixing apparatus 7 through each transfer device 5. The recording medium 6 reaching the fixing apparatus 7 is nipped and conveyed, while being heated and pressed, by a nip portion formed by a pair of fixing rollers comprising a heating roller having a heater lamp (not shown) and a pressure roller, and the toner image is fused and fixed on the recording medium 6.

The recording medium 6 sent from the fixing apparatus 7 is alternately folded and separated in a sheet delivery section, and folded and stacked thereon.

Further, after the photoreceptor drum 1 passed through the transfer device 5 is cleaned by a cleaning apparatus, not shown, a condition of a surface potential is adjusted by a discharger, and the photoreceptor drum 1 stands by for the next printing operation.

The charger 2, and exposing apparatus 3, the developing roller 4A, and a toner density sensors 1 provided in the developing apparatus 4, are respectively connected to a printing density setting apparatus 13 and 14 through controllers 8, 9, 10 and 12.

Among printing mechanisms, the printing mechanism connected to the printing density setting apparatus 14, is the printing mechanism for a monochromatic printing in which the black toner is loaded in the developing apparatus 4, and two printing mechanisms connected to the printing density setting apparatus 13 are the printing mechanisms for color printing in which the color toners other than black are filled in the developing apparatus 4.

As the dropout color used for portions of entry frames or notes of the payment sheets of the bank or test answer-sheets (mark sheets), red, blue and green are mainly used, therefore, in this embodiment, the light and shade control range of the printing density in the printing density setting apparatus 13 connected to the printing mechanism for color printing is provided so that the light and shade control range of the printing density can be changed within the range from the dropout color to non-dropout color.

Figure 2:
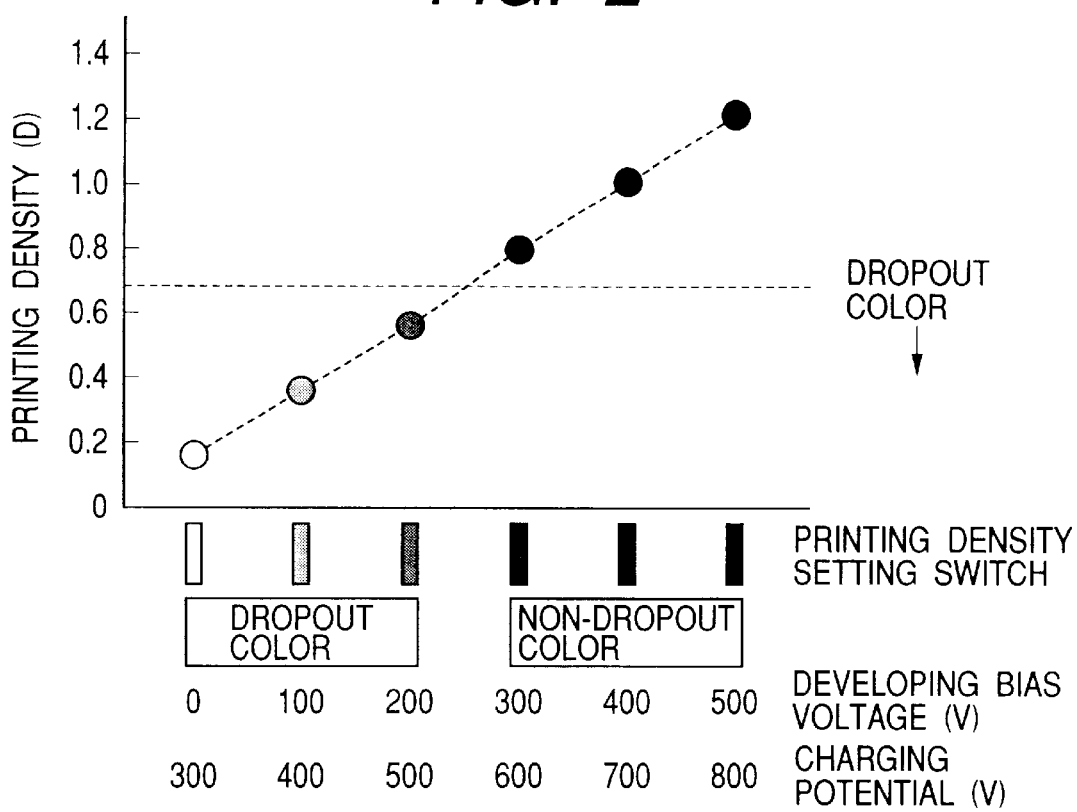
FIG. 2 is an illustration showing a relationship between developing bias voltage and printing density.
Figure 3:
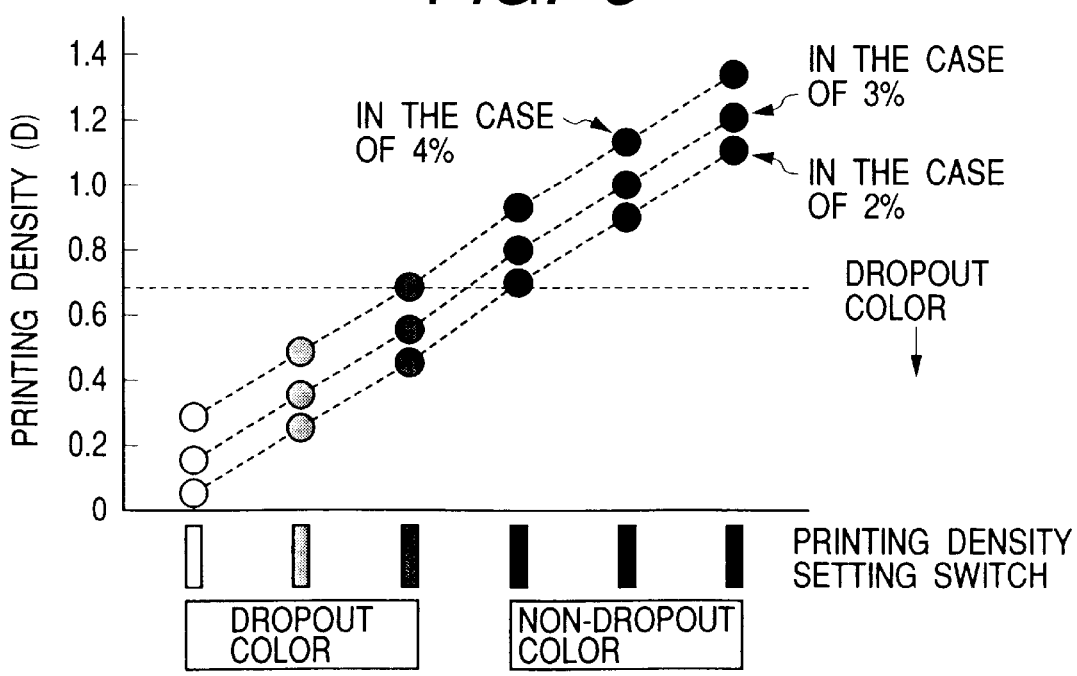
FIG. 3 is an illustration showing a relationship between toner density and the printing density.
Figure 4:
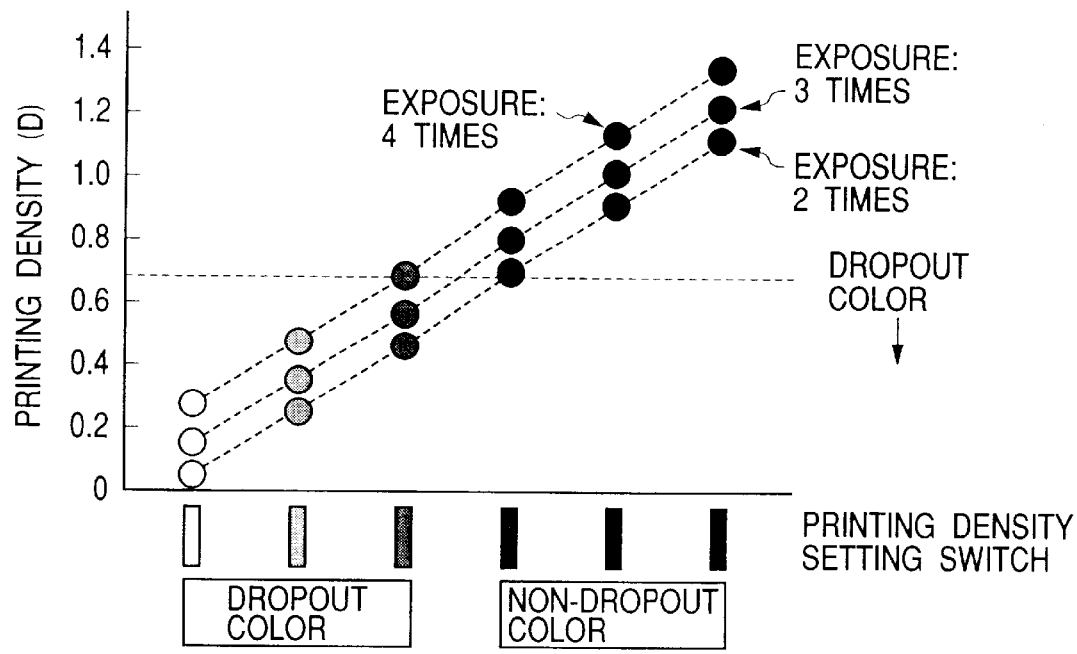
FIG. 4 is an illustration showing a relationship between exposure intensity and the printing density.
Figure 5A:
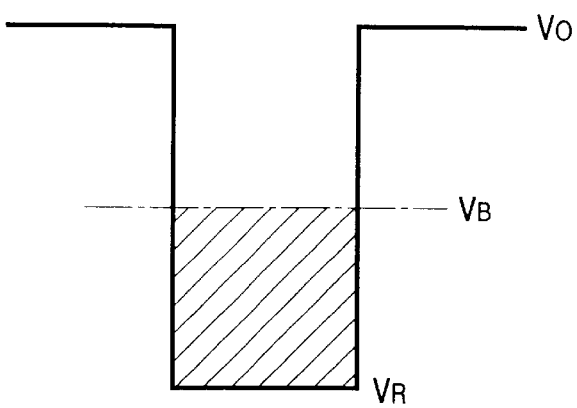
FIGS. 5A and 5B are illustrations each showing a principle of a reversal development system.
Figure 5B:
Figure 6A:
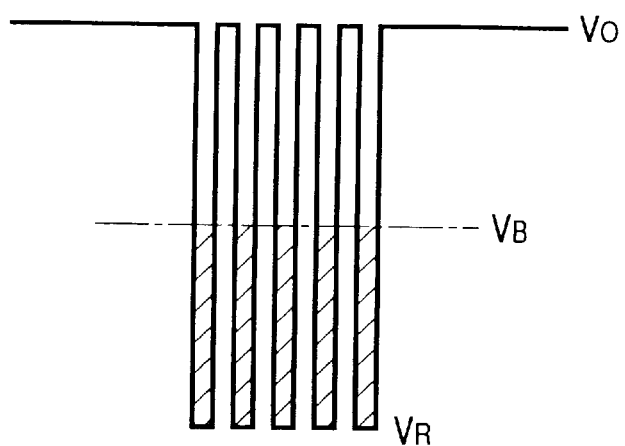
FIGS. 6A and 6B are illustrations each showing a principle of a dot printing.
Figure 6B:
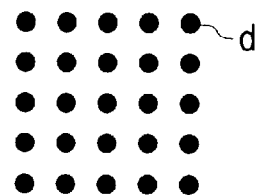
Figure 7:
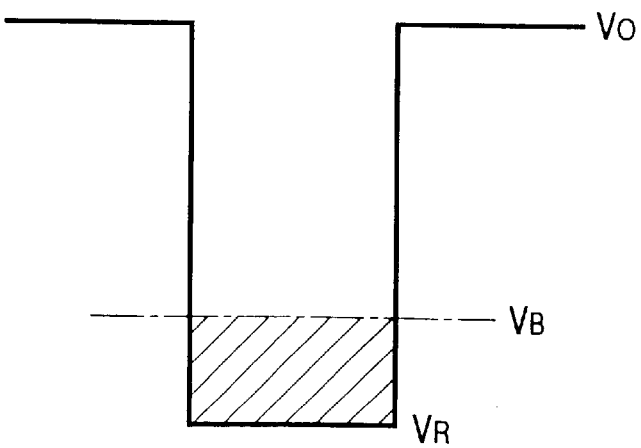
FIG. 7 is an illustration showing a relationship between a density of a toner image and the developing bias voltage.

Then the printing density is changed by a method shown in FIG. 2–FIG. 4 so that the dropout color printing and the normal non-dropout color printing can be conducted by the printing density setting apparatus 13 of the color printing or the printing density setting apparatus 14 of the black printing.

FIG. 2 is an illustration showing a relationship between the developing bias voltage applied onto the developing roller and the printing density. When the full color printing represented by a photograph or an one-point color printing aimed at a visual effect is conducted, it is necessary that the developing bias voltage is not smaller than 300 V (about 400 V is preferable) by which the printing density of 1.0 D 1.4 D can be secured. However, in the case where the OCR job is conducted, the printing is conducted under a condition that the developing bias voltage is set to a value not more than 200 V (about 100 V is desirable) in order to suppress the printing density to a value not more than 0.7 D. In this case, there is sometimes a disadvantage that, when the changeable width of the developing bias voltage applied onto the developing apparatus is large, the surplus toner is adhered onto an area which will be a background portion at the time of printing, or when the developer is a two-component type developer, even the carrier in the developer adheres onto the surface of the photoreceptor drum, therefore, it is necessary that the charging potential $V_0$ of the photoreceptor drum can also be changed in synchronism with the developing bias voltage $V_B$. It is preferable that, when the developing bias voltage is 400 V, the charging potential (surface potential) is controlled to about 700 V, and when the developing bias voltage is 200V, the charging potential is controlled to about 500 V.

FIG. 3 is an illustration showing a relationship between the toner density which is a mixing ratio of the toner and the carrier, and the printing density. When non-dropout color printing is conducted, it is preferable that the toner density in the developing apparatus is adjusted to 3–4%, and when the dropout color printing is conducted, it is preferable that the toner density in the developing apparatus is adjusted to 2–3%.

FIG. 4 is an illustration showing a relationship between an exposure intensity of the exposing apparatus and the printing density. When non-dropout color printing is conducted, it is preferable that the exposure is set to 3–4 times of the exposure by which the potential of the photoreceptor surface is decreased to a half, and when the dropout color printing is conducted, it is preferable that exposure is set to about 1.5–2.5 times thereof.

The dropout color printing may be conducted by controlling any one of the developing bias voltage control, surface potential control, toner density control and exposure control. The dropout color printing may also be conducted by a combination of some of them, or by using all of them.

According to the printing apparatus comprising the above-described structure, since the printing of the entry frames or the notes by the dropout color, and the printing of the normal characters or the images by non-dropout color can be conducted by one printing apparatus, it is not necessary that a portion of the dropout color is ordered to the outside contract manufacturer, and the prints of the dropout color can be easily obtained.

According to the invention as described above, an electrophotographic printing apparatus in which the light and shade adjustment of the printing density can be conducted in the broad range, and which can also cope with the dropout color printing, can be provided.

What is claimed is:

1. An electrophotographic printing apparatus comprising:

a photoreceptor;

a charger for charging the photoreceptor to a predetermined charging potential $|V_0|$;

an exposing unit for exposing the charged photoreceptor and recording on the photoreceptor an electrostatic latent image having an electrostatic latent image section potential $|V_R|$ which is lower than the charging potential $|V_0|$;

a developing unit having a developing roller on which a developing bias potential $|V_B|$ is applied, where the developing bias potential $|V_B|$ is set between the charging potential $|V_0|$ and the electrostatic latent image section potential $|V_R|$, the developing unit for adhering a powder color toner held on the developing roller to a portion of the charging potential on the photoreceptor when the developing method is a normal developing method and to a portion of the electrostatic latent image section potential on the photoreceptor when the developing method is a reversal developing method, to form a toner image on the photoreceptor; and a printing density controller for changing a printing density within a range from a dropout color to a non-dropout color, wherein the printing density controller changes the developing bias potential $|V_B|$, corresponding to the printing density, to an arbitrary value between the charging potential $|V_0|$ and the electrostatic latent image section potential $|V_R|$; and the printing density controller changes the charging potential $|V_0|$ in proportion to the change of the developing bias voltage $|V_B|$.

2. The electrophotographic printing apparatus according to claim 1, wherein the printing density controller changes an exposure intensity of the exposing unit.

3. The electrophotographic printing apparatus according to claim 1, wherein the developing unit uses a developer containing the powder color toner and a carrier triboelectric-charged with the powder color toner; and the printing density controller adjusts a mixing ratio of the powder color toner and carrier.

4. The electrophotographic printing apparatus according to claim 1, wherein a toner density controller is provided in said developing unit, and said toner density controller is connected to said printing density controller through at least one controller.

* * * * *